(12) United States Patent
Zhang

(10) Patent No.: US 11,061,794 B1
(45) Date of Patent: Jul. 13, 2021

(54) METHODS, SYSTEMS, AND COMPUTER READABLE MEDIUMS FOR OPTIMIZING DATA PROCESSING

(71) Applicant: VCE Company, LLC, Richardson, TX (US)

(72) Inventor: Ying Victor Zhang, Plano, TX (US)

(73) Assignee: EMC IP HOLDING COMPANY LLC, Round Rock, TX (US)

( * ) Notice: Subject to any disclaimer, the term of this patent is extended or adjusted under 35 U.S.C. 154(b) by 963 days.

(21) Appl. No.: 14/626,629

(22) Filed: Feb. 19, 2015

(51) Int. Cl.
 *G06F 11/34* (2006.01)
(52) U.S. Cl.
 CPC .................. *G06F 11/3409* (2013.01)
(58) Field of Classification Search
 None
 See application file for complete search history.

(56) References Cited

U.S. PATENT DOCUMENTS

2013/0014107 A1* 1/2013 Kirchhofer .......... G06F 9/5083
718/1

* cited by examiner

*Primary Examiner* — Sue A Purvis
*Assistant Examiner* — Aneta B Cieslewicz
(74) *Attorney, Agent, or Firm* — Jenkins, Wilson, Taylor & Hunt, P.A.

(57) ABSTRACT

Methods, systems, and computer readable mediums for optimizing data processing are disclosed. According to one exemplary embodiment, a method for optimizing data processing includes receiving data usage information associated with at least one user-defined key performance indicator (KPI), determining, using the data usage information, optimization information for optimizing data processing, and providing the optimization information to at least one resource.

15 Claims, 4 Drawing Sheets

400

402
RECEIVE DATA USAGE INFORMATION ASSOCIATED WITH AT LEAST ONE USER-DEFINED KEY PERFORMANCE INDICATOR (KPI)

404
DETERMINE, USING THE DATA USAGE INFORMATION, OPTIMIZATION INFORMATION FOR OPTIMIZING DATA PROCESSING

406
PROIVIDE THE OPTIMIZATION INFORMATION TO AT LEAST ONE RESOURCE

METHODS, SYSTEMS, AND COMPUTER READABLE MEDIUMS FOR OPTIMIZING DATA PROCESSING

TECHNICAL FIELD

The subject matter described herein relates to data processing. More specifically, the subject matter relates to methods, systems, and computer readable mediums for optimizing data processing.

BACKGROUND

Management systems can include user interfaces (UIs) and/or graphical user interfaces (GUIs) for managing, monitoring, viewing, and/or configuring one or more components (e.g., physical resources and/or virtual resources) within or associated with a computing system, e.g., a backend computing system separate from the management software. Traditionally, management systems pre-define a set of key performance indicators (KPIs) and/or related reports, with limited options to personalize them. Since these management systems are generally limited in the amount of KPIs and reports generated, such systems can be designed in such a manner that ensures the systems can efficiently process these pre-canned KPIs. However, with the advent of software-defined networks, virtualization, and highly-personalized user interfaces, such as search-centric interfaces and custom KPIs, rules, policies, etc., management systems are increasingly becoming more complex and require new ways to efficiently perform these additional functions, including handling user-defined data requests.

SUMMARY

Methods, systems, and computer readable mediums for optimizing data processing are disclosed. According to one exemplary embodiment, a method for optimizing data processing includes receiving data usage information associated with at least one user-defined key performance indicator (KPI), determining, using the data usage information, optimization information for optimizing data processing, and providing the optimization information to at least one resource.

BRIEF DESCRIPTION OF THE DRAWINGS

The subject matter described herein will now be explained with reference to the accompanying drawings of which.

DETAILED DESCRIPTION

Figure 1:
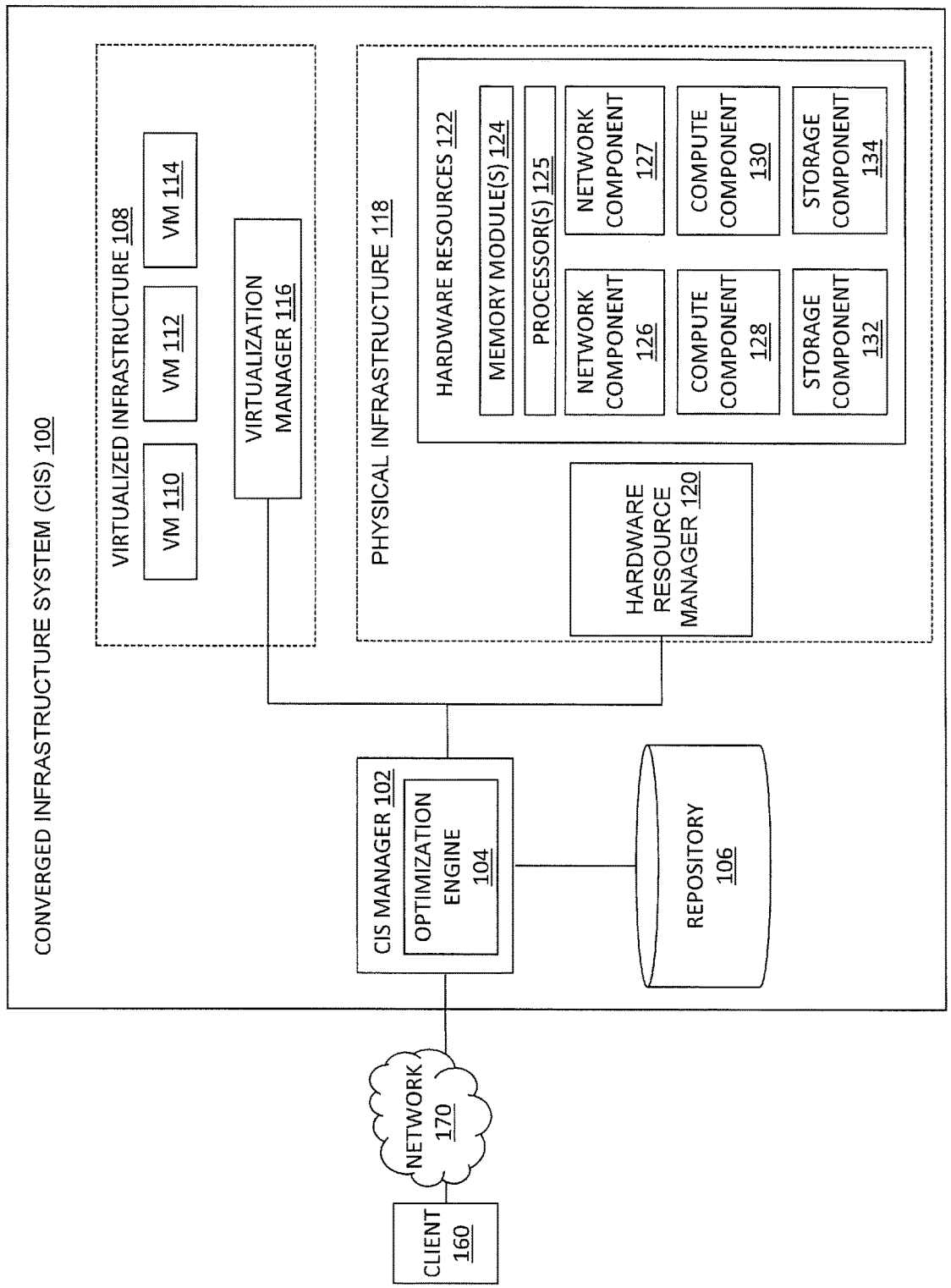
FIG. 1 is a diagram illustrating an exemplary converged infrastructure system according to an embodiment of the subject matter described herein.

The subject matter described herein includes methods, systems, and computer readable mediums for optimizing data processing. In accordance with some aspects of the disclosed subject matter, functionality for optimizing data processing can involve interacting with one or more converged infrastructure system (CISs), such as an integrated infrastructure system (e.g., a Vblock® System from VCE Company, LLC), and/or computing system components (CSCs) therein. For example, a CIS can comprise multiple CSCs, such as physical resources and/or virtual resources, in a preconfigured or prepackaged computing platform, where some CSCs are developed and/or manufactured by multiple entities. For example, an exemplary CIS can comprise data storage devices, servers, networking equipment, and software for managing physical resources and/or virtualized resources (e.g., virtual servers). Although portions of the following disclosure describes the use of one or more CISs, any integrated infrastructure system or device can be utilized without departing from the scope of the present subject matter.

In accordance with some aspects of the disclosed subject matter, a computing platform (e.g., a node or device) or module (e.g., firmware, hardware, and/or software executing on a processor) can include functionality for optimizing data processing. For example, data usage information (e.g., user inputs, key performance indicators (KPIs), KPI definitions, search queries, custom reports, and/or access patterns) can be collected and analyzed to determine optimizations for more efficiently processing data requests. As used herein, the terms "KPI" or "KPI definition" may refer to one or more data points and/or related algorithms and/or formulas using the one or more data points for indicating performance. In this example, the optimizations can include allocating more resources for generating or compiling frequently requested data and/or by pre-computing certain data such that common and/or frequent data requests can be handled more efficiently.

Advantageously, some aspects of the disclosed subject matter can allow a management system to efficiently handle a full spectrum of user-defined KPIs, rules, policies, and queries by leveraging knowledge about past, present, and/or future data usage to optimize data processing. For example, a management system may monitor cloud infrastructures across multiple locations, covering all aspects including physical, logical, and virtual resources. Using search-centric user interfaces, a user can actively request particular information to be provided in specific, user-defined ways, as opposed to passively consuming what the system has pre-defined as available reports. By utilizing mechanisms for determining and implementing optimizations using data usage information, such systems can provide increased usability (e.g., flexibility in defining custom KPIs), productivity (e.g., timely delivery of KPIs), and efficiency.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary CIS 100 according to an embodiment of the subject matter described herein. Although the following disclosure describes the use of CIS 100, any type of computer system can be utilized without departing from the scope of the present subject matter. CIS 100 can comprise CSCs, such as virtual resources and physical resources. Exemplary physical resources can comprise a processor, a memory module, a compute component, a network component, a storage component, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CISs), a virtual machine, a virtual server, a virtual storage device, a virtual port, and/or a virtual communications interface. CIS 100 can also comprise software and related components for managing the CIS and/or portions (e.g., CSCs) therein.

In some embodiments, CIS 100 can be configured to provide data management functionality, cloud service functionality, and/or other functionality. CIS 100 can be capable of communicating with other CISs (e.g., located at various physical locations or sites) and can communicate with various other entities, such as network nodes (e.g., servers hosting online sites) and users. For example, client 160 can represent any entity (e.g., software executing on a processor, a web-based interface, etc.) for allowing a user (e.g., a human operator or an automated system) to interact with CIS 100, CSCs therein, and/or other entities. In some embodiments, client 160 can communicate directly with CIS 100 with or without using network 170.

In some embodiments, CIS 100 can comprise a CIS manager 102, a repository 106, virtualized infrastructure 108, and/or physical infrastructure 118. CIS manager 102 can be any suitable entity for managing aspects of CIS 100 or portions therein (e.g., CSCs or groups of CSCs). CIS manager 102 can be configured to communicate with various CSCs and/or for managing various CSCs. For example, CIS manager 102 can be configured to access each CSC within CIS 100 and return relevant information to client 160. For example, CIS manager 102 can be configured to manage performance, resource utilization levels, and other aspects associated with virtualized infrastructure 108 and/or physical infrastructure 118. In some embodiments, CIS manager 102 can comprise VCE Vision™ Intelligent Operations software and/or firmware.

In some embodiments, CIS manager 102 can include a converged infrastructure management application for interacting with CIS 100 and/or CSCs therein. In such embodiments, the converged infrastructure management application can include or provide a graphical user interface (GUI), a command-line interface (CLI), an application programming interface (API), and/or or other communications interface. For example, a converged infrastructure management application can provide a web-based GUI containing a query page for requesting information about a CIS 100 and/or CSCs therein.

CIS manager 102 can comprise or interact with an optimization engine 104. Optimization engine 104 can be any suitable entity (e.g., hardware, firmware, and/or software executing on a processor) for performing one or more aspects associated with optimizing data processing. For example, optimization engine 104 can be configured to receive data usage information, to determine, using the data usage information, optimization information for optimizing data processing, and to provide the optimization information to at least one resource (e.g., a physical or virtual resource) for implementing optimizations.

In some embodiments, data usage information can include search history, user inputs, custom KPIs, security policies, quality of service (QoS) policies, access rules, execution frequencies, historical information, preconfigured information, management information, and user preference information. For example, data usage information can provide insight into what users are most focused on, their use patterns, and/or their preferences.

Some exemplary KPIs may include a processing utilization metric (e.g., CPU usage) and/or a memory utilization metric per host (e.g., percentage of utilized processing resources per VM), a storage utilization metric per array or storage component, a network throughput metric per communications interface or VM, a service request timeout rate, a service request average response time, one or more network QoS metrics, and/or one or more service level agreement (SLA) metrics.

In some embodiments, optimization engine 104 and/or a related entity may collect and/or analyze data usage information. For example, optimization engine 104 and/or a related entity may collect custom KPIs and/or related KPI definitions across multiple computing systems. In this example, optimization engine 104 and/or a related entity may compile a top ten list of most popular or most frequently accessed KPIs associated with a CIS, a CSC, a set of users, a location, or other criteria. Continuing with this example, optimization engine 104 and/or a related entity may use the top ten list in determining optimizations, such as performing actions that would allow a related management system to provide all of the top ten KPIs quickly and efficiently.

In some embodiments, optimization engine 104 may use data usage information or related information for determining one or more optimizations associated with data processing. Exemplary optimizations may include adjusting a thread pool, adjusting a cache size, adjusting a run-time priority, adjusting resource allocation(s), pre-computing a KPI, and/or pre-processing data (e.g., prior to receiving a relevant data request). For example, optimization engine 104 may determine based on data usage information that certain optimizations may be implemented for a management system. In this example, the management system may be optimized by allocating a memory portion (e.g., a cache) and/or increasing the memory allocation so as to store static information that is likely to be repeatedly requested by a user or a set of users. Continuing with this example, by allocating a memory portion to store frequently requested static information, the management system may provide the static information from the memory portion instead of performing data store queries.

In some embodiments, an optimization that may be implemented may include adjusting a thread pool associated with data processing. For example, a processor in a management system may be assigned a number of threads (e.g., sets of computer executable instructions or tasks) that can execute concurrently. In this example, this number of threads may be known as a thread pool. Continuing with this example, if optimization engine 104 determines that increasing or decreasing the size of the thread pool for the processor will improve data processing, optimization engine 104 may trigger the management system to increase or decrease the size of the thread pool.

In some embodiments, an optimization that may be implemented may include adjusting a run-time priority associated with data processing. For example, a management system may assign a run-time priority to each task being executed or about to be executed. In this example, if a task is assigned a higher run-time priority, a processor may execute the thread prior to executing a task assigned a lower run-time priority. Continuing with this example, if optimization engine 104 determines that increasing or decreasing a run-time priority associated with a particular thread will improve data processing, optimization engine 104 may trigger the management system to increase or decrease the run-time priority associated with the thread.

In some embodiments, an optimization that may be implemented may include adjusting resource allocations associated with data processing. For example, a management system may allocate resources to perform various tasks based on preconfigured settings, algorithms, and/or user preferences. In this example, if a custom KPI that requires a lot of processing resources is requested regularly for a number of physical servers across multiple locations, optimization engine 104 may determine that allocating additional processing resources and/or load balancers will improve data processing and, as such, optimization engine 104 may trigger the management system to allocate more resources and give the tasks higher run-time priority.

In some embodiments, an optimization that may be implemented may include pre-executing a KPI and/or pre-processing data. For example, a management system may generally execute a KPI or perform other actions in response to a data request. In this example, if optimization engine 104 determines that pre-computing a KPI and/or pre-processing related data will improve data processing (e.g., because optimization engine 104 or another entity has determine that such information will likely be requested soon), optimization engine 104 may trigger the management system to pre-execute a KPI and/or to pre-process related data.

In some embodiments, optimization related information can be stored in repository 106. Repository 106 can include any data storage unit (e.g., a database or plurality of databases) that can be configured to store optimization related information, such as data usage information, lists of frequently accessed KPIs, instructions for implementing optimizations, and/or other information. Although FIG. 1 depicts repository 106 as a local data storage unit residing on CIS 100, repository 106 can also be embodied as a data storage unit located at an online location (e.g., a public distributed content site), on a local proxy server in a customer's or system administrator's environment, or on a different CIS without departing from the scope of the disclosed subject matter. Further, repository 106 can be implemented using one or more computing platforms, devices, or systems.

In some embodiments, repository 106 can be provisioned with optimization related information from a second repository (e.g., from a second CIS or from an online location, such as a known, online site that can be hosted by the CIS manufacturer). For example, optimization related information can be obtained or copied from a second repository (e.g., a second CIS, an online site, online repository, or any other online location) over network 170, using secure copy (SCP) protocol, file transfer protocol (FTP), secure file transfer protocol (SFTP), hypertext transfer protocol (HTTP), or any like protocol. In some embodiments, CIS 100 and a second CIS can be located at a common site and can be communicatively connected by a wired connection. In such a configuration, repository 106 can be provisioned with optimization related information from the second CIS via the wired connection. It is understood that the provisioning of repository 106 with optimization related information using the exemplary methods described above can be conducted via any automated or automatic manner. In addition, optimization related information copied from a second repository and installed into repository 106 can utilize any form of transportable mediums, such as a compact disc (CD), flash memory, a universal serial bus (USB) device, and the like.

Virtualized infrastructure 108 can comprise a virtualization environment configured to simulate components of a computing device, such as a processor, system memory, and a storage device, for executing one or more virtual machines (VMs) (e.g., VM 110, VM 112, and VM 114). Each of VM 110, VM 112, and VM 114 can be configured to perform various functions and/or services, such as web server functions or cloud application services, and can interact with various nodes, components, and/or users.

In some embodiments, virtualized infrastructure 108 can be associated with one or more virtual entities. Each virtual entity can comprise one or more CIS or portions therein, e.g., CSCs from one or more CISs. In some embodiments, virtualization manager 116 can allow logical entities to be created, deleted, or modified using an API and/or a GUI. Virtualization manager 116 can be any suitable entity (e.g., software executing in a virtual machine) for managing aspects associated with virtualized infrastructure 108. In some embodiments, virtualization manager 116 can be configured for providing data management via one or more communications interfaces. For example, virtualization manager 116 can communicate with one or more third-party management tools using APIs.

Physical infrastructure 118 can comprise hardware resources 122, such as memory module(s) 124, processor(s) 125, network components 126-127, compute components 128-130, and storage components 132-134. Hardware resources 122 can be communicatively connected to various other CSCs in CIS 100 and other entities. Hardware resources 122 can be configured for use by one or more virtual entities. In some embodiments, network components 126-127 (e.g., network switches) can be configured to enable communication between the components in CIS 100. In some embodiments, one or more file share storage (FSS) systems (not shown) can be utilized to provide file system level access to a CIS across a local area network (LAN).

Hardware resource manager 120 can be any suitable entity (e.g., software executing in a virtual machine) for managing aspects associated with physical infrastructure 118. In some embodiments, hardware resource manager 120 can be configured to provision hardware resources 122 via one or more communications interfaces. For example, hardware resource manager 120 can provision hardware resources 122 for implementing one or more virtual entities in virtualized infrastructure 108. In some embodiments, hardware resource manager 120 can comprise any management component or entity, such as a unified infrastructure manager (UIM) or a unified computing system (UCS) director entity, which is configured to provision the physical hardware of CIS 100.

In some embodiments, processor(s) 125 can include a microprocessor (e.g., a trusted platform module (TPM) using trusted execution technology (TXT)), central processing unit (CPU), or any other like hardware based processing unit. In some embodiments, some aspects of the disclosed subject matter can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of some aspects of the disclosed subject matter. In some embodiments, each of storage components 132-134 can include any storage medium or storage unit that is configured to store information accessible by processor(s) 125 via a system bus. In some embodiments, repository 106 or portions thereof can utilize storage components 132-134 and/or memory module(s) 124. For example, repository 106 may be implemented using storage component 132. In some embodiments, repository 106 and/or storage components 132-134 can include or utilize one or more storage area networks.

As indicated above, the subject matter disclosed herein can be implemented in software in combination with hardware and/or firmware. For example, subject matter described herein can be implemented in software executed by a processor. In some exemplary implementations, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, an optimization engine 104 or repository 106 (e.g., a system library or data therein) can be located at a single computing system or can be distributed across one or more devices, platforms, and/or systems. As used in the disclosed subject matter, the terms "function" or "module" refer to hardware, firmware, or software in combination with hardware and/or firmware for implementing features described herein.

In some embodiments, various entities depicted in FIG. 1 can be incorporated or implemented using one or more other entities depicted in FIG. 1. For example, memory module(s) 124 and/or processor(s) 125 can be incorporated in compute component 128, compute component 130, and/or a specialized device or compute component (e.g., an application management pod (AMP)). In another example, CIS manager 102 can be implemented using or located in an AMP and/or another device in physical infrastructure 118. In yet another example, virtualization software and/or virtualized components can be implemented using an AMP and/or another compute device (e.g., a blade appliance designated for some system management software).

It will be appreciated that FIG. 1 is for illustrative purposes and that various components, their locations, and/or their functions as described above in relation to FIG. 1 can be changed, altered, added, or removed. For example, optimization engine 104 can comprise multiple, distributed components, e.g., a reporting component associated with reporting data usage and user activities, a collecting component for collecting and analyzing reporting data, and an optimizing component for using collected data to optimize data processing. Further, aspects of the disclosed subject matter (e.g., optimization engine 104) can be implemented and/or located on any computing system or components therein.

Figure 2:
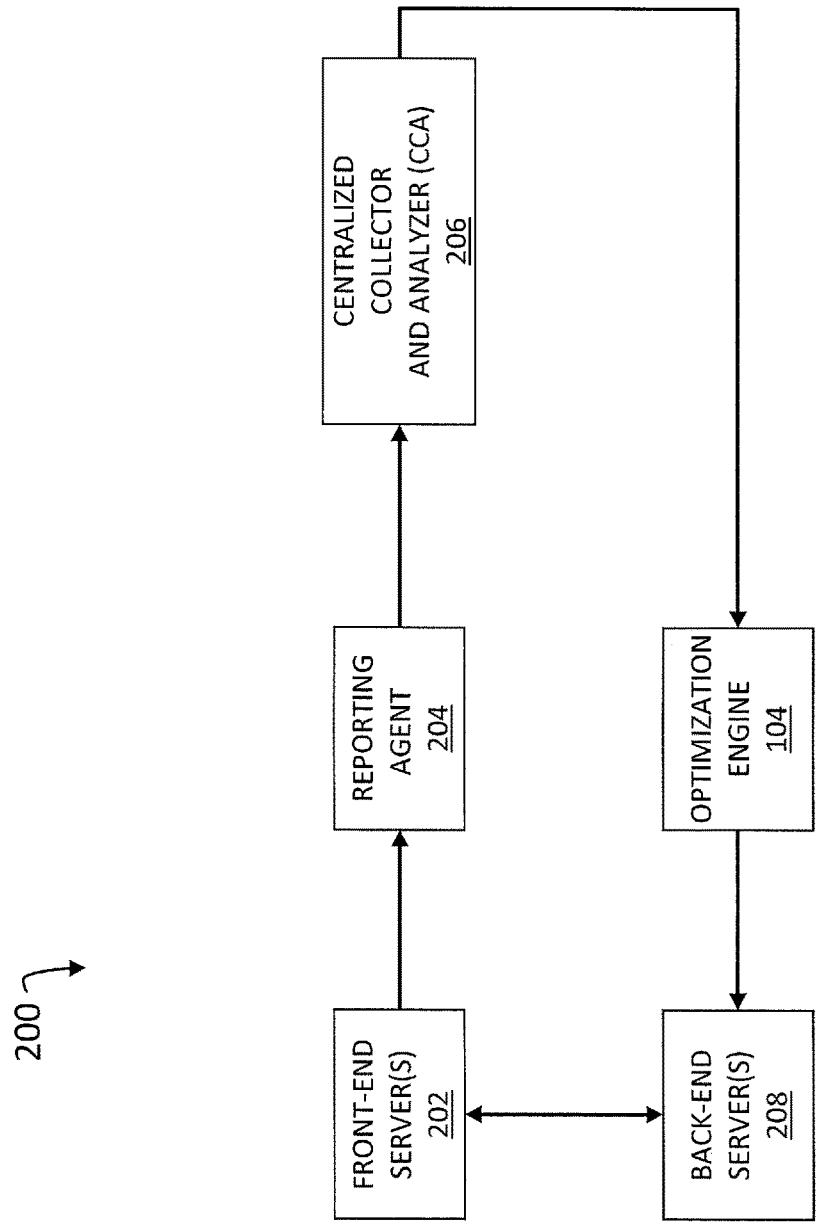
FIG. 2 is a diagram illustrating an exemplary optimization system for optimizing data processing according to an embodiment of the subject matter described herein.

FIG. 2 is a diagram illustrating an exemplary optimization system 200 for optimizing data processing according to an embodiment of the subject matter described herein. Exemplary optimization system 200 can include one or more entities (e.g., subsystems, modules, and/or components) for performing one or more aspects associated with optimizing data processing.

Referring to FIG. 2, optimization system 200 can include one or more front-end server(s) 202, a reporting agent 204, a centralized collector and analyzer (CCA) 206, optimization engine 104, and one or more back-end server(s) 208. Front-end server(s) 202 can be any suitable entity or entities (e.g., software executing on one or more processors) for communicating with a user and/or for providing data associated with one or more data requests. For example, front-end server(s) 202 can include a computing platform implemented using a hardware-based processor and/or memory and can contain a user interface for receiving data requests from a requesting entity, e.g., a network operator or a management system. In this example, front-end server(s) 202 can provide data requests to back-end server(s) 208 and for receiving responses from back-end server(s) 208. Continuing with this example, front-end server(s) 202 can be configured to use the responses from back-end server(s) 208 to provide information (e.g., a report) to the requesting entity.

In some embodiments, user input may be gathered or received by front-end servers 202 and the user input may be sent from front-end servers 202 to reporting agent 204. For example, user input may include search queries, KPI definitions, and/or other information obtained via a user interface. In this example, front-end servers 202 may be configured to store user input in repository 106 or other storage for retrieval by reporting agent 204. In another example, front-end servers 202 may be configured to provide user input (e.g., periodically) to reporting agent 204.

Reporting agent 204 can be any suitable entity or entities (e.g., software executing on one or more processors) for providing data usage information to CCA 206. For example, reporting agent 204 can periodically or aperiodically (e.g., dynamically) report data usage information (e.g., user inputs, custom KPIs, search queries, access rules, security policies, etc.) to CCA 206.

CCA 206 can be any suitable entity or entities (e.g., software executing on one or more processors) for receiving information from reporting agent 204 and/or for providing information to optimization engine 104. In some embodiments, CCA 206 can analyze data usage information and can correlate, rank, prioritize, and/or sort the data usage information based on various factors, such as complexity, frequency, processing time, popularity, etc. For example, CCA 206 can collect data usage information, including when (e.g., time of day) and where (e.g., which location, which CIS, and/or which endpoint) data requests or user activities occur. In this example, CCA 206 can use the data usage information to identify the most popular and/or most frequently requested information, e.g., in the last two hours. Continuing with this example, CCA 206 can provide this information and/or other information (e.g., optimization recommendations) to optimization engine 104.

Optimization engine 104 can be any suitable entity or entities (e.g., software executing on one or more processors) for performing one or more aspects associated with optimizing data processing. For example, optimization engine 104 can request and receive data usage information and/or other information (e.g., a list of frequently requested KPIs and/or optimization recommendations) from CCA 206. In this example, optimization engine 104 can determine what, if any, optimizations to implement using the received information from CCA 206, and can provide optimization information to at least one resource (e.g., back-end server(s) 208 or components therein) for implementing any optimizations.

In some embodiments, optimization engine 104 may determine one or more optimizations to perform or implement based on various factors. For example, optimization engine 104 may select certain optimizations from a plurality of optimizations based on recommendations from CCA 206 and/or network operator preferences. In another example, optimization engine 104 may select certain optimizations based on historical information, such as selecting an optimization because it has the highest average percentage of performance improvement or utilization improvement over other optimizations in the past two months. In yet another example, optimization engine 104 may select certain optimizations based on the anticipated overall processing demand, such as increasing optimizations performed or implemented dynamically based on anticipated overall processing demand.

Back-end server(s) 208 can be any suitable entity or entities (e.g., software executing on one or more processors) for processing data associated with one or more data requests and/or providing data to one or more requesting entities. For example, back-end server(s) 208 can include a computing platform containing one or more data structures containing information about components, a computing system, a group of computing systems, and/or services performed therein. In this example, back-end server(s) 208 can generate, compute, and/or compile data associated with data requests and can provide the data to front-end server(s) 202.

In some embodiments, back-end server(s) 208 can receive and utilize optimization information (e.g., instructions for optimizing one or more resources associated with back-end server(s) 208). For example, if a custom KPI for a particular server requires a significant amount of resources to process but the custom KPI is frequently requested by many users, optimization engine 104 can instruct back-end server(s) 208 to allocate a sufficient percentage of processing resources for computing the KPI. In this example, optimization engine 104 can also instruct the processing resources to pre-execute the KPI at frequent intervals and/or to execute the KPI for other servers, e.g., regardless of whether a user is currently requesting the KPI.

In some embodiments, depending on network environments, system 200 can include numerous instances of various entities (e.g., reporting agent 204, CCA 206, and/or optimization engine 104) and/or may use instances for different users, servers, locations, etc.

In some embodiments, system 200 can use a push model or pull model to receive data from or provide data to one or more entities. For example, reporting agent 204 can periodically report user activities to CCA 206 and/or CCA 206 can periodically provide data usage information to optimization engine 104. In another example, in response to CCA 206 requesting a report from reporting agent 204, reporting agent 204 can report user activities to CCA 206 and/or in response to optimization engine 104 requesting data from CCA 206, CCA 206 can provide data usage information to optimization engine 104.

It will be appreciated that FIG. 2 is for illustrative purposes and that various components, their locations, and/or their functions as described above in relation to FIG. 2 can be changed, altered, added, or removed.

Figure 3:
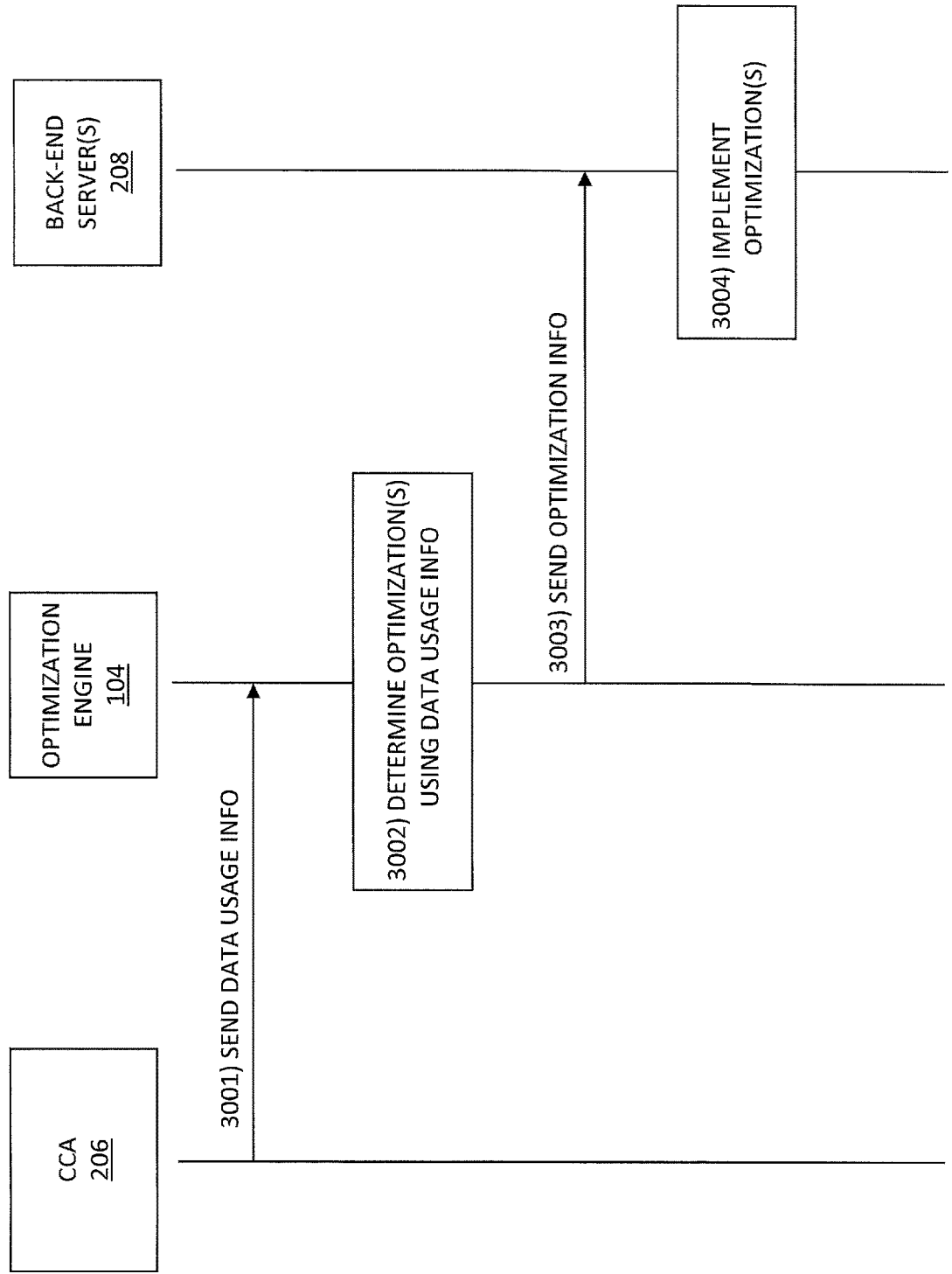
FIG. 3 is a diagram illustrating exemplary communications associated with optimizing data processing according to an embodiment of the subject matter described herein.

FIG. 3 is a diagram illustrating exemplary communications associated with optimizing data processing according to an embodiment of the subject matter described herein. Referring to FIG. 3, at step 3001, data usage information can be sent from CCA 206 to optimization engine 104. For example, CCA 206 can analyze data usage information from one or more users and/or across one or more computer systems. In this example, CCA 206 can provide analyzed data usage information, e.g., a list of frequently requested data (e.g., custom KPIs) and/or optimization recommendations, to optimization engine 104.

At step 3002, one or more optimizations can be determined using the data usage information from CCA 206. For example, the data usage information may indicate that a custom KPI for analyzing the performance of VM 110 has been requested every thirty minutes for the last two hours and that the KPI requires around 20 minutes to execute with currently allocated resources. In this example, in response to the data usage information, optimization engine 104 can determine that an optimization for processing the custom KPI includes allocating additional resources for computing the KPI (e.g., at least for the next few hours) so as to shortened the computation time associated with the KPI and/or to start computing the KPI at appropriate intervals such that the user can receive relatively recent KPI with little to no wait time (e.g., from the time of his request).

At step 3003, optimization information can be sent from optimization engine 104 to back-end server(s) 208. For example, optimization information can be sent from optimization engine 104 to back-end server(s) 208 for instructing back-end server(s) 206 to implement one or more optimizations.

At step 3004, optimization(s) can be implemented at back-end server(s) 208. For example, in response to receiving optimization information from optimization engine 104, back-end server(s) 206 may use the optimization information in implementing one or more optimizations.

It will be appreciated that FIG. 3 is for illustrative purposes and that additional and/or different steps than those depicted in FIG. 3 can be usable for optimizing data processing. Additionally, it will be appreciated that steps depicted in FIG. 3 can occur in a different order than depicted.

Figure 4:
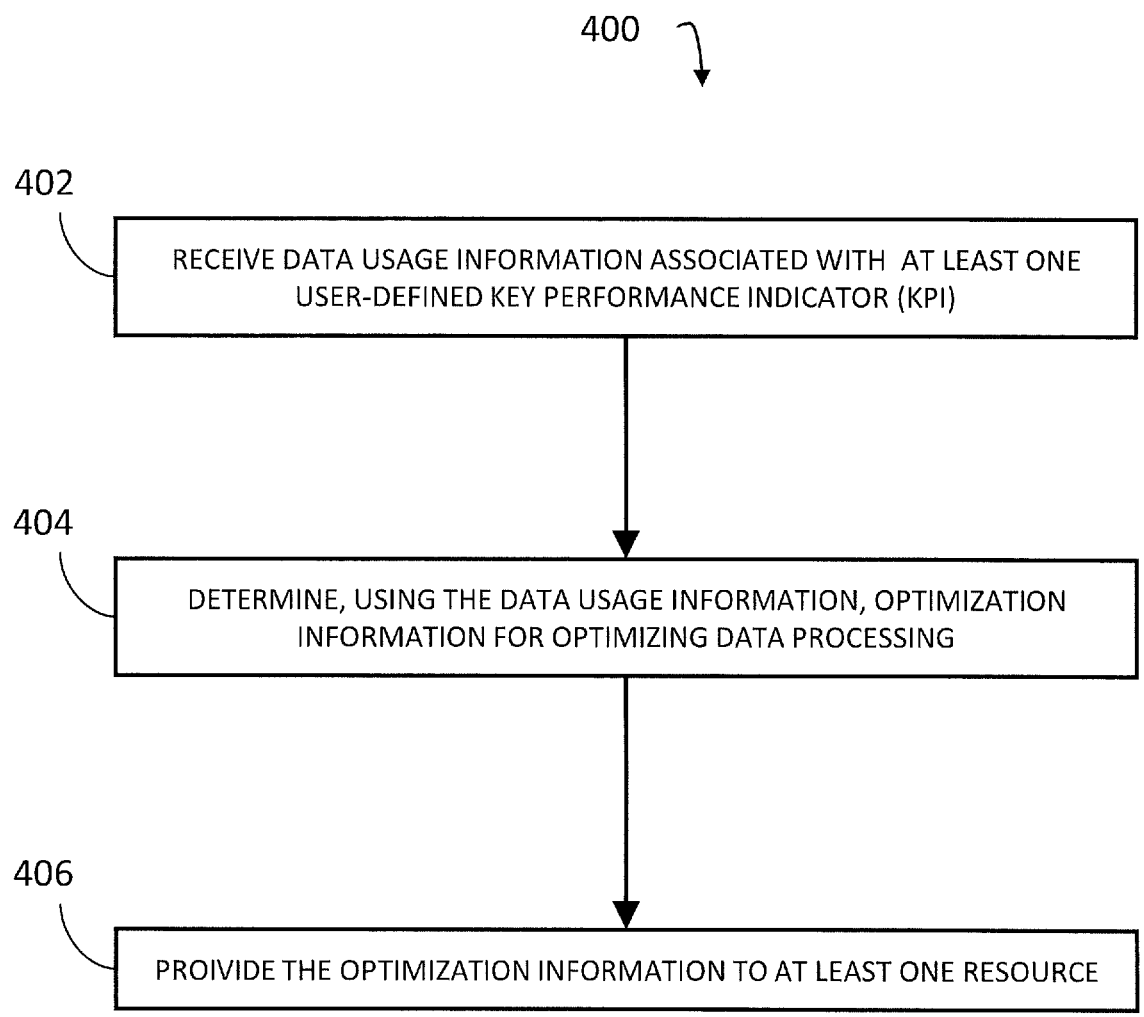
FIG. 4 is a diagram illustrating an exemplary method for optimizing data processing according to an embodiment of the subject matter described herein.

FIG. 4 is a diagram illustrating an exemplary method 400 for optimizing data processing according to an embodiment of the subject matter described herein. In some embodiments, exemplary method 400 and/or steps therein can be performed by CIS 100, optimization engine 104, system 200, and/or another module or node (e.g., a server or computing platform containing one or more processors and memory). For illustrative purposes and explanation, references to entities included in FIGS. 1-3 may be used below.

At step 402, data usage information associated with at least one user-defined KPI can be received. In some embodiments, receiving data usage information can include receiving the data usage information periodically and/or aperiodically (e.g., dynamically).

In some embodiments, data usage information can include at least one member selected from a group consisting of a search query, a user activity, a user input, a custom indicator, an access rule, a security policy, a quality of service (QoS) policy, historical information, preconfigured information, management information, and user preference information.

In some embodiments, data usage information can include information obtained from at least one member selected from a group consisting of a user interface, a computing platform, a computing device, a converged infrastructure system, a virtual machine, a hypervisor, a compute component, a network component, a storage component, software, an operating system, firmware, hardware, a physical resource, and a virtual resource.

At step 404, optimization information for optimizing data processing can be determined using the data usage information.

In some embodiments, determining, using data usage information, optimization information can include ranking at least one user-defined KPI using at least one member selected from a group consisting of complexity, frequency, processing time, and/or popularity.

At step 406, the optimization information can be provided to at least one resource.

In some embodiments, optimization information can include at least one member selected from a group consisting of information for adjusting a thread pool, information for adjusting a cache size, information for adjusting a run-time priority, information for adjusting resource allocations, information for pre-computing at least one user-defined KPI, and/or information for pre-processing data associated with the at least one user-defined KPI.

In some embodiments, a resource for optimization can include at least one member selected from a group consisting of a user interface, a computing platform, a computing device, a CIS, a virtual machine, a hypervisor, a compute component, a network component, a storage component, software, an operating system, firmware, hardware, a physical resource, and/or a virtual resource.

It should be noted that optimization engine 104 and/or functionality described herein can constitute a special purpose computing system. Further, optimization engine 104 and/or functionality described herein can improve the technological field of data management systems by optimizing data processing based on or using data usage information, thereby allowing available resources to efficiently handle data requests from users, including generating, computing, and/or providing custom KPIs or other user requested information.

It will be understood that various details of the subject matter described herein can be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for optimizing data processing, the method comprising:
    at a computing platform configured to use data usage information to optimize data processing in a managed computing environment:
        receiving, using a user interface, the data usage information associated with at least one user-defined key performance indicator (KPI) related to the managed computing environment, wherein the at least one user-defined KPI is different from pre-defined KPIs, wherein the data usage information includes information indicative of an amount or a frequency that the at least one user-defined KPI is used;
        determining, using the data usage information, optimization information for optimizing computation of the at least one user-defined KPI; and
        optimizing, using the optimization information, the computation of the at least one user-defined KPI by pre-computing, using at least one processing resource of the computing platform, the at least one user-defined KPI based on the amount or the frequency that the at least one user-defined KPI is used.

2. The method of claim 1 wherein the data usage information includes a search query, a user activity, a user input, a custom indicator, an access rule, a security policy, a quality of service (QoS) policy, historical information, preconfigured information, management information, or user preference information.

3. The method of claim 1 wherein receiving the data usage information includes receiving the data usage information periodically.

4. The method of claim 1 wherein the data usage information includes information obtained from a second computing platform different from the computing platform, a converged infrastructure system, a virtual machine, a hypervisor, a compute component, a network component, a storage component, software, an operating system, firmware, hardware, a physical resource, or a virtual resource.

5. The method of claim 1 wherein determining, using the data usage information, the optimization information includes ranking the at least one user-defined KPI using complexity, frequency, processing time, or popularity associated with the at least one user-defined KPI.

6. A system for optimizing data processing, the system comprising:
    a computing platform comprising:
        a processor; and
        an optimization engine implemented using the processor, wherein the optimization engine is configured to use data usage information to optimize data processing in a managed computing environment, wherein the optimization engine is configured to receive, using a user interface, the data usage information associated with at least one user-defined key performance indicator (KPI) related to the managed computing environment, wherein the at least one user-defined KPI is different from pre-defined KPIs, wherein the data usage information includes information indicative of an amount or a frequency that the at least one user-defined KPI is used, to determine, using the data usage information, optimization information for optimizing computation of the at least one user-defined KPI, and to optimize, using the optimization information, the computation of the at least one user-defined KPI by pre-computing, using at least one processing resource of the computing platform, the at least one user-defined KPI based on the amount or the frequency that the at least one user-defined KPI is used.

7. The system of claim 6 wherein the data usage information includes a search query, a user activity, a user input, a custom indicator, an access rule, a security policy, a quality of service (QoS) policy, historical information, preconfigured information, management information, or user preference information.

8. The system of claim 6 wherein the optimization engine is configured to receive the data usage information periodically.

9. The system of claim 6 wherein the data usage information includes information obtained from a second computing platform different from the computing platform, a converged infrastructure system, a virtual machine, a hypervisor, a compute component, a network component, a storage component, software, an operating system, firmware, hardware, a physical resource, or a virtual resource.

10. The system of claim 6 wherein the optimization engine is configured to rank the at least one user-defined KPI using complexity, frequency, processing time, or popularity associated with the at least one user-defined KPI.

11. A non-transitory computer readable medium having stored thereon executable instructions which, when executed by a processor of a computer, cause the computer to perform steps comprising:
    at a computing platform configured to use data usage information to optimize data processing in a managed computing environment:
        receiving, using a user interface, the data usage information associated with at least one user-defined key performance indicator (KPI) related to the managed computing environment, wherein the at least one user-defined KPI is different from pre-defined KPIs, wherein the data usage information includes information indicative of an amount or a frequency that the at least one user-defined KPI is used;

determining, using the data usage information, optimization information for optimizing computation of the at least one user-defined KPI; and optimizing, using the optimization information, the computation of the at least one user-defined KPI by pre-computing, using at least one processing resource of the computing platform, the at least one user-defined KPI based on the amount or the frequency that the at least one user-defined KPI is used.

12. The non-transitory computer readable medium of claim 11 wherein the data usage information includes a search query, a user activity, a user input, a custom indicator, an access rule, a security policy, a quality of service (QoS) policy, historical information, preconfigured information, management information, or user preference information.

13. The non-transitory computer readable medium of claim 11 wherein receiving the data usage information includes receiving the data usage information periodically.

14. The non-transitory computer readable medium of claim 11 wherein the data usage information includes information obtained from, a second computing platform different from the computing platform, a converged infrastructure system, a virtual machine, a hypervisor, a compute component, a network component, a storage component, software, an operating system, firmware, hardware, a physical resource, or a virtual resource.

15. The non-transitory computer readable medium of claim 11 wherein determining, using the data usage information, the optimization information includes ranking the at least one user-defined KPI using complexity, frequency, processing time, or popularity associated with the at least one user-defined KPI.

* * * * *